Oct. 4, 1966 C. C. DE PEW 3,276,615
FILLER CAP ASSEMBLY
Filed Feb. 9, 1965 2 Sheets-Sheet 1
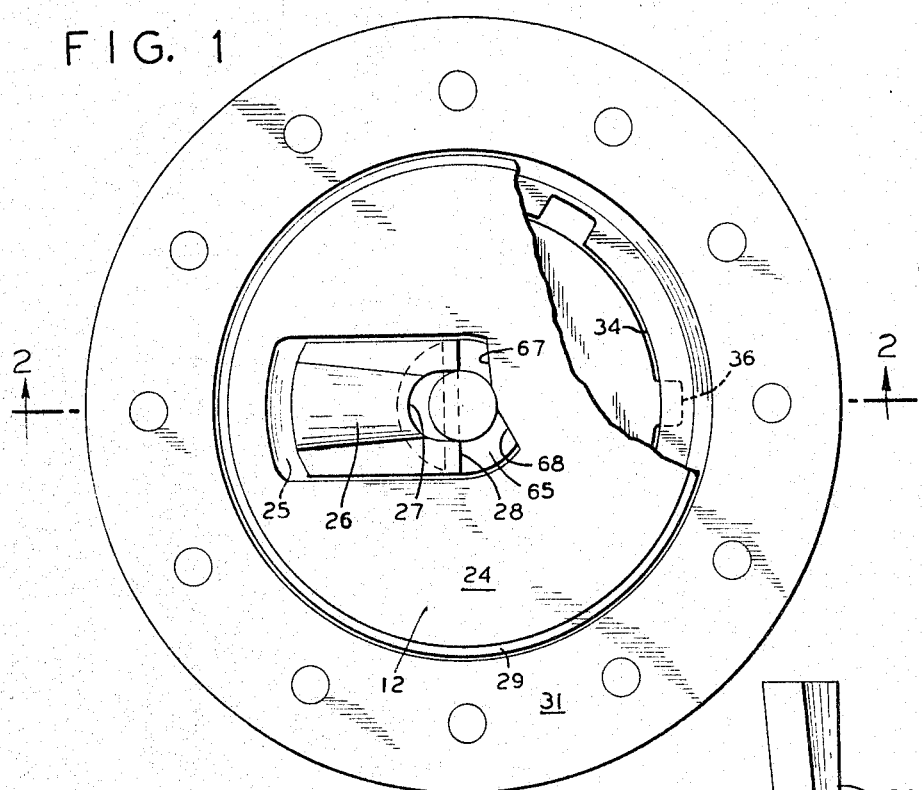
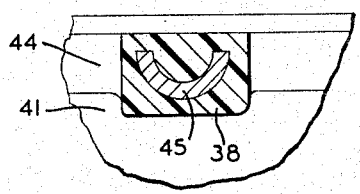
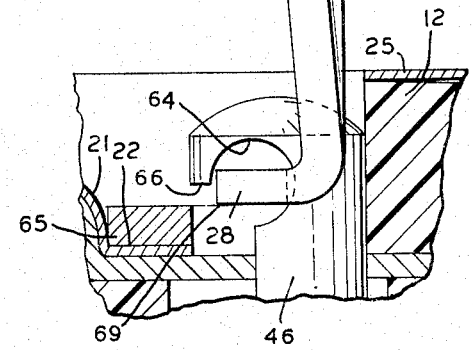
INVENTOR.
CHESTER C. DE PEW
BY
JOHN P. CHANDLER
HIS ATTORNEY.

Oct. 4, 1966  C. C. DE PEW  3,276,615
FILLER CAP ASSEMBLY

Filed Feb. 9, 1965  2 Sheets-Sheet 2

INVENTOR.
CHESTER C. DE PEW
BY JOHN P. CHANDLER
HIS ATTORNEY.

3,276,615
FILLER CAP ASSEMBLY
Chester C. De Pew, Farmingdale, N.Y., assignor to
Chester Corporation, Wilton, Conn.
Filed Feb. 9, 1965, Ser. No. 431,325
10 Claims. (Cl. 220—25)

This invention relates to filler cap assemblies, designed primarily for fuel tanks for aircraft, and relates more particularly to an improved filler cap having a higher electrical safety factor than conventional filler caps and wherein the metallic, stress-carrying members are enclosed within a hard, tough plastic shell which is suitably molded around the same and providing a structure with no exposed metal parts except for a sheet metal handle carried at the upper end of a stud, also of metal, which supports and rotates a pressure plate which urges a base plate, carrying an O-ring, into firm sealing engagement with an adapter ring carried by the fuel tank.

The filler cap assembly is primarily of insulated construction, which provides a greater safety factor electrically, than an all metallic cap. It is also provided on its upper surface with a grounding plate whose annular rim contacts the adapter around its entire periphery and in the case of an electrical discharge in the area of the filler cap, produced by static electricity, lightning, or by other causes, the charge is conducted harmlessly to the ground, i.e. to the metal body of the plane which is ground.

Another object of the invention is to provide an improved handle structure for rotating the pressure plate in filler cap assemblies and which is less expensive and is more easily installed than conventional handles having a separate pivot pin, and which is foolproof in operation.

Figure 5:
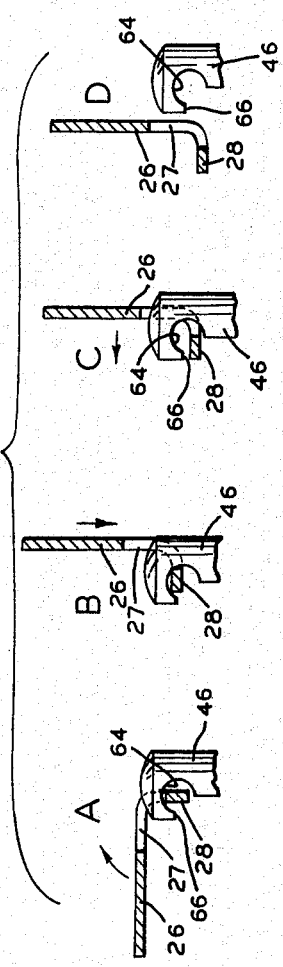
Figure 2:
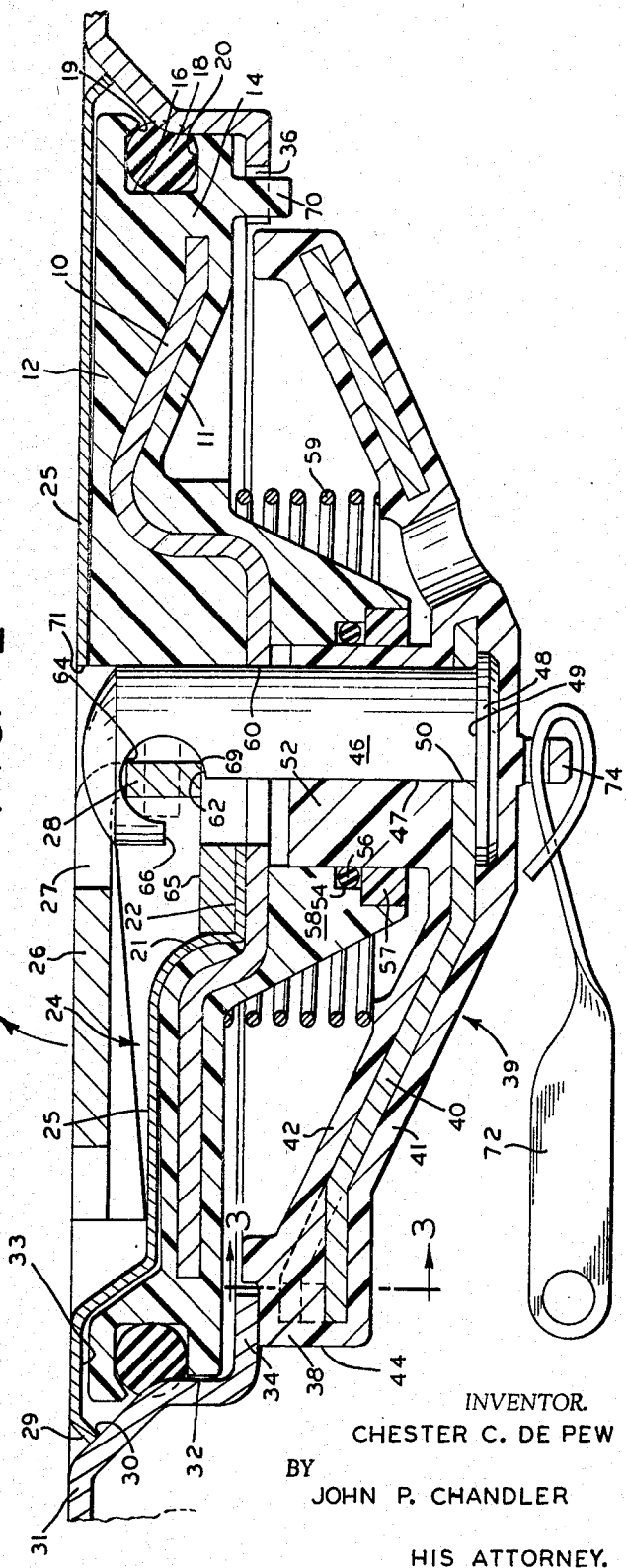

In the drawings:
FIG. 1 is a plan view of a filler cap assembly of the present invention;
FIG. 2 is a section taken on line 2—2 of FIG. 1;
FIG. 3 is a section taken on line 3—3 of FIG. 2;
FIG. 4 shows the improved handle in raised position;
FIG. 5 is an exploded view thereof.

In the illustrated embodiment of the invention the base plate is a casting made from plastic material and is reinforced by metal, the metal plate 10, being entirely encased within a molded plastic shell which has a lower wall 11 and an upper wall 12 which are joined around the rim 14 and having a generally C shaped configuration in cross section providing an annular slot 16 to receive an O ring 18. The upper wall of the slot is inclined downwardly at its outside edge 19 to confine the O ring. The lower wall 20 of the slot is flat and is of lesser diameter than the upper wall.

The central section of the upper wall is recessed downwardly as shown at 21 on the left hand side only and receives the central, downwardly recessed portion 22 of a sheet metal grounding plate 24 which has a downwardly recessed section 25 on the left hand side as in FIG. 1 to provide space for a pivoted handle 26 in substantially flush relation with the upper wall of the grounding plate, when the cap is in locked position. This handle has a central opening 27 extending into a right angular extension 28.

The rim of the grounding plate is bent diagonally downwardly at 29 and engages the diagonal annular rim 30 of the adapter 31. It may also be flat and engage the upper annular face of the adapter under pressure. When the filler cap is removed from the adapter the grounding plate is flat and contacts the upper face of the base plate. When the filler cap is in closed position as in FIG. 2 the grounding plate is flexed upwardly and is then separated slightly from the base plate around its rim as shown at 33. The adapter has a vertical section 32 at the lower end of the diagonal section, and a lower horizontal rim 34 with slots 36 to permit lugs 38 of a pressure plate 39 formed from a combination of plastic material and metal to pass therethrough. This pressure plate has a metal reinforcing plate 40 which is entirely encased within a plastic shell having a lower wall 41 joined to an upper wall 42 around its periphery 44. The metal plate 40 has section 45 which extends into its lugs 38 to afford reinforcement. These extensions have a generally C shape in cross section as seen in FIG. 3.

A rotatable metal stud 46 having a flat side 47 and an enlarged rim 48 at its lower end supports the pressure plate 39 and this rim is engaged on its upper annular face 49 by the inner edge 50 of a central opening in the metal reinforcing plate 40 encased within the molded plastic shell. Above the metal plate 40, the stud is disposed in a plastic hub 52 extending upwardly from upper wall 42 of the plastic shell and having a non-circular opening to fit the stud so that the pressure plate turns with the stud, rotated by handle 26. The hub is engaged by an O ring 56 carried in an annular recess 54 in a hub 58 formed at the center of the lower plastic wall 11 of the base plate. A ring 57 cemented in a counterbore at the lower end of hub 58 retains the O ring in place. The pressure plate is urged downwardly by a compression spring 59 between the base plate and the pressure plate.

The stud passes upwardly through an opening 60 in the base plate of such cross sectional shape as to permit the stud with its flat side 47 to turn only about 30°. At the upper end of the stud there is a generally horizontal recess 62 extending inwardly, along the side of the stud having the flat side 47. This radial recess extends inwardly about ¾ of the diameter of the stud and is formed with a curved upper wall 64 and an overhanging section 66. This pivot-receiving opening receives the rectangular cross piece or pivot element 28 formed integrally with handle 26. The pivot element has two outer edges of which the right hand edge 69 acts as a cam when the handle is rotated through an arc from the vertical position of FIG. 4 to its horizontal position of FIG. 1, to pull the pressure plate with its clamping fingers, up and forcing the O ring 16 firmly against the annular, diagonal seat 30–32 of the adapter.

When in the vertical position the handle acts as a flag to indicate an unlocked condition of the assembly. This cam works against a wear plate or washer 65 of C shape and made from hard metal supported on top of the central recess 22 of the grounding plate.

The recess 22 which receives the C shaped wear plate is shaped to snugly receive the same and on the right hand side, when viewed as in FIG. 1 has two short radial sections 67 and 68. When the assembly is to be inserted in the adapter ring, the handle 26 is turned in a counterclockwise direction its maximum distance as defined by the shape of opening 60 in the base plate, at which time the clamping lugs 38 are lined up with adapter slots, and finger 70 carried by the base plate is in one of these slots as well. It will be noted that the grounding plate 24 has a central opening to permit the stud to pass therethrough and this opening shown at 71 to the right of the stud is vertically aligned with the plastic upper wall 12 of the base plate immediately thereunder.

As soon as the lugs pass below the lower ring 36 of the adapter, the handle is turned in the opposite direction its maximum allowed rotation, after which the handle is rotated down to the position of FIG. 1. When the filler cap is in its unfastened condition, it is retained captive by a plastic strap 72 received in a boss 74 in the bottom of the pressure plate.

It will be appreciated that the novel handle combination with the rotatable stud has utility in other filler cap assemblies and that it is easier to mount at the upper end of the stud than pivoted handle using removable pivot pins, since the circular recess 64 with its side wall access is readily assembled and disassembled.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim:

1. A closure cap assembly to be received in a slotted adapter ring in a fuel tank, said assembly including a metal base plate for effecting the closure and having a central opening and a central recess on its upper surface, and a metal pressure plate, each enclosed in a shell formed of molded plastic material and providing relatively thin upper and lower plastic walls therefor, the pressure plate having a plurality of radial clamping lugs extending beyond its annular margin and adapted to pass through the slots in the adapter ring, after which said plate is rotated to cause the lugs to underlie the adapter ring, a stud secured at the center of the pressure plate and extending through the central opening in the base plate, a handle pivoted at the upper end of the stud and having a cam to draw the pressure plate upwardly as the handle is rotated.

2. The structure recited in claim 1 and wherein the cam is formed in an inner angular extension of the handle, and the upper end of the stud has a horizontal radial opening to receive said extension and form a pivot element therefor.

3. The structure recited in claim 1 and wherein a grounding plate covers the entire upper surface of the base plate and whose outer periphery engages the adapter under pressure to form an electrical connection with the same.

4. The structure recited in claim 1 and wherein the upper wall of the base plate has a recess to receive the handle in flush relation when the assembly is in sealed relation.

5. The structure recited in claim 1 and wherein the metal plate in the pressure plate has radial portions extending into the lugs to reinforce the same.

6. A closure cap assembly to be received in a sloted adapter ring in a fuel tank, said assembly including a metal base plate for effecting the closure and having a central opening and a central recess on its upper surface, and a metal pressure plate, each enclosed in a shell formed of molded plastic material and providing relatively thin upper and lower plastic walls therefor, the pressure plate having a plurality of radial clamping lugs extending beyond its annular margin and adapted to pass through the slots in the adapter ring, after which said plate is rotated to cause the lugs to underlie the adapter ring, a stud secured at the center of the pressure plate and extending through the central opening in the base plate, a handle at the upper end of the stud which is horizontal when the assembly is in sealed condition and which has a short, right angular extension at its inner end and having a central opening extending into said extension, leaving a cross piece therein forming a pivot, the stud having a horizontal slot extending inwardly from one side and which receive the pivot element, one outer edge of said pivot forming a cam to draw the pressure plate upwardly as the handle is rotated.

7. A closure cap assembly to be received in a slotted adapter ring in a fuel tank, said assembly including a metal base plate having a central opening and a central recess on its upper surface, and a metal pressure plate, each enclosed in a shell formed of molded plastic material and providing relatively thin upper and lower plastic walls therefor, resilient means around the periphery of the base plate for effecting a seal with the adapter ring, the pressure plate having a plurality of radial clamping lugs extending beyond its annular margin and adapted to pass through the slots in the adapter ring after which said plate is rotated to cause the lugs to underlie the adapter ring, a stud carrying a handle for rotating the pressure plate, the latter having a cam surface to draw the pressure plate upwardly to sealing position.

8. A closure cap assembly to be received in a slotted adapter ring in a fuel tank, said assembly including a metal base plate having a central opening and a central recess on its upper surface, and a metal pressure plate, each enclosed in a shell formed of molded plastic material and providing thin upper and lower plastic walls therefor, the plastic shell which encloses the base plate having an annular peripheral groove, and an O ring in the groove, forming a seal with the adapter ring, the pressure plate having a plurality of radial clamping lugs extending beyond its annular margin and adapted to pass through the slots in the adapter ring, the metal plate in the pressure plate having radial projections passing into said lugs and being generally C shaped in cross section, a stud secured at the center of the pressure plate and extending through the central opening in the base plate, a handle pivoted at the upper end of the stud and having a cam to draw the pressure plate upwardly as the handle is rotated through an arc downwardly to a horizontal position, a hardened wear plate in the central recess engaged by the cam, and a grounding plate extending over the upper face of the base plate and below the wear plate and whose annular margin contacts the adapter around its entire periphery to form an electrical connection therebetween.

9. A handle and stud combination mounted for rotation in a base plate in a filler cap assembly to rotate a pressure plate carried below the base plate and draw the two plates together, said stud having a slot extending inwardly from one side thereof near its upper end and having an upwardly curved extension forming its upper wall, the handle being stamped from sheet metal and provided with a right angular extension and having a central opening which continues into said extensions and providing a cross piece of generally rectangular cross section to form a pivot which resides in the stud slot, one outer edge of the pivot forming a cam which, acting against the upper central face of the base plate during rotation of the stud from vertical to horizontal position, draws the pressure plate upwardly.

10. A handle and stud combination wherein the stud is fixed to one of two superimposed members and mounted for rotation in a second member, said stud having a transverse opening near its upper end and a slot extending inwardly from one side thereof to said opening, the handle being stamped from sheet metal and provided with a right angular extension and having a central opening which continues into said extension and providing a cross piece which is of generally rectangular cross section to form a pivot which resides in the stud slot, one outer edge of the pivot forming a cam which, acting against the upper central face of the upper member during rotation of the stud from vertical to horizontal position, draws the lower member upwardly.

References Cited by the Examiner

UNITED STATES PATENTS

| | | | |
|---|---|---|---|
| 2,735,571 | 2/1956 | Lockwood | 220—25 |
| 2,839,215 | 6/1958 | De Pew | 220—25 |
| 3,115,267 | 12/1963 | Whitman | 220—25 |
| 3,173,570 | 3/1965 | De Pew | 220—45 |

THERON E. CONDON, *Primary Examiner.*

G. T. HALL, *Assistant Examiner.*